(12) United States Patent
Okajima

(10) Patent No.: US 7,331,639 B2
(45) Date of Patent: Feb. 19, 2008

(54) BICYCLE RIM

(75) Inventor: Shinpei Okajima, Osaka (JP)

(73) Assignee: Shimano Inc., Osaka (JP)

( * ) Notice: Subject to any disclaimer, the term of this patent is extended or adjusted under 35 U.S.C. 154(b) by 152 days.

(21) Appl. No.: 11/266,483

(22) Filed: Nov. 4, 2005

(65) Prior Publication Data

US 2007/0102995 A1 May 10, 2007

(51) Int. Cl.
*B60B 21/06* (2006.01)
*B60B 25/00* (2006.01)
(52) U.S. Cl. .................... 301/58; 301/95.107
(58) Field of Classification Search ........... 301/55, 301/58, 64.704, 67, 70, 95.101, 95.102, 95.103, 301/95.104, 95.105, 95.106, 95.107, 95.108, 301/104; 29/894.33, 894.333
See application file for complete search history.

(56) References Cited

U.S. PATENT DOCUMENTS

| | | | |
|---|---|---|---|
| 4,983,430 A | 1/1991 | Sargent | |
| 4,995,675 A | 2/1991 | Tsai | |
| 5,490,719 A | 2/1996 | Lew | |
| 5,540,485 A | 7/1996 | Enders | |
| 5,549,360 A | 8/1996 | Lipeles | |
| 5,975,645 A | 11/1999 | Sargent | |
| 6,283,557 B1 | 9/2001 | Okajima et al. | |
| 6,347,839 B1 | 2/2002 | Lew et al. | |
| 6,398,313 B1 | 6/2002 | Lew | |
| 6,736,462 B1 * | 5/2004 | Okajima | 301/58 |
| 6,761,847 B2 | 7/2004 | Meggiolan | |
| 2004/0222689 A1 | 11/2004 | Okajima | |

FOREIGN PATENT DOCUMENTS

| | | |
|---|---|---|
| DE | 202 02 273 U1 | 6/2002 |
| EP | 1 428 685 A2 | 6/2004 |
| EP | 1698489 | 9/2006 |
| JP | 60-080902 A | 5/1985 |
| JP | 60080902 A * | 5/1985 |
| JP | 61-125901 A | 6/1986 |
| JP | 61244602 A * | 10/1986 |
| JP | 62-128803 A | 6/1987 |
| JP | 2003-260904 A | 9/2003 |

* cited by examiner

*Primary Examiner*—Russell D. Stormer
*Assistant Examiner*—Kip Kotter
(74) *Attorney, Agent, or Firm*—Global IP Counselors, LLP

(57) ABSTRACT

A bicycle rim is configured with an annular metallic rim, a plurality of individual reinforcement members and at least one adhesive attachment material. The annular metallic rim has an annular tire attachment portion adapted to have a tire mounted thereon, and a spoke attachment portion with a plurality of spoke openings. The individual reinforcement members overlie discrete exterior surface areas of the spoke attachment portion surrounding the spoke openings. The at least one adhesive attachment material overlies the individual spoke reinforcements and exterior areas of the spoke attachment portion adjacent to the reinforcement members.

14 Claims, 5 Drawing Sheets

BICYCLE RIM

BACKGROUND OF THE INVENTION

1. Field of the Invention

This invention generally relates to a bicycle rim. More specifically, the present invention relates to a reinforced bicycle rim that has reinforcement members at the spoke openings.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

Recently, bicycle wheels have been designed that have utilized spokes with higher tension between the rim and the hub to provide a more rigid wheel. When the tension in the spokes becomes very high, very strong rims are required. If the rim is made thicker over its entire circumference or a steel rim is used, then the rim may become undesirable heavy. Thus, several attempts have been made to create rims that are lightweight and can accommodate high tension spokes. One example of a bicycle rim that can accommodate high tension spokes is disclosed in U.S. Pat. No. 6,283,557, assigned to Shimano, Inc. The bicycle rim of this patent uses spokes that are attached to side surfaces of the rim by using special washers. While this rim works very well, it requires special washers that are attached to the end of the spokes with spokes having a bent end. Several bicycle wheels have been developed that use straight spokes. These straight spokes are very strong and allow for higher tension to be used in the spokes. However, again, when the tension in the straight spokes becomes very high, then very strong rims are required. As a result, thicker and/or reinforced rims are needed when using straight spokes under high tension. Some of these reinforcements are welded or brazed to the rim, which can result in the physical properties of the rim being altered by the heat of the welding or brazing process. Thus, these thicker or reinforced rims are often heavy, difficult to manufacture and/or expensive to manufacture.

In view of the above, it will be apparent to those skilled in the art from this disclosure that there exists a need for an improved reinforced rim. This invention addresses this need in the art as well as other needs, which will become apparent to those skilled in the art from this disclosure.

SUMMARY OF THE INVENTION

One object of the present invention is to provide a rim for a bicycle wheel that is relatively strong yet relatively lightweight.

Another object of the present invention is to provide a rim that is relatively simple and inexpensive to manufacture and assemble.

The foregoing objects can basically be attained by providing a bicycle rim that comprises an annular metallic rim, a plurality of individual reinforcement members and at least one adhesive attachment material. The annular metallic rim includes an annular tire attachment portion adapted to have a tire mounted thereon, and a spoke attachment portion with a plurality of spoke openings. The individual reinforcement members overlie discrete exterior surface areas of the spoke attachment portion surrounding the spoke openings. The at least one adhesive attachment material overlies the individual spoke reinforcements and exterior areas of the spoke attachment portion adjacent to the reinforcement members.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
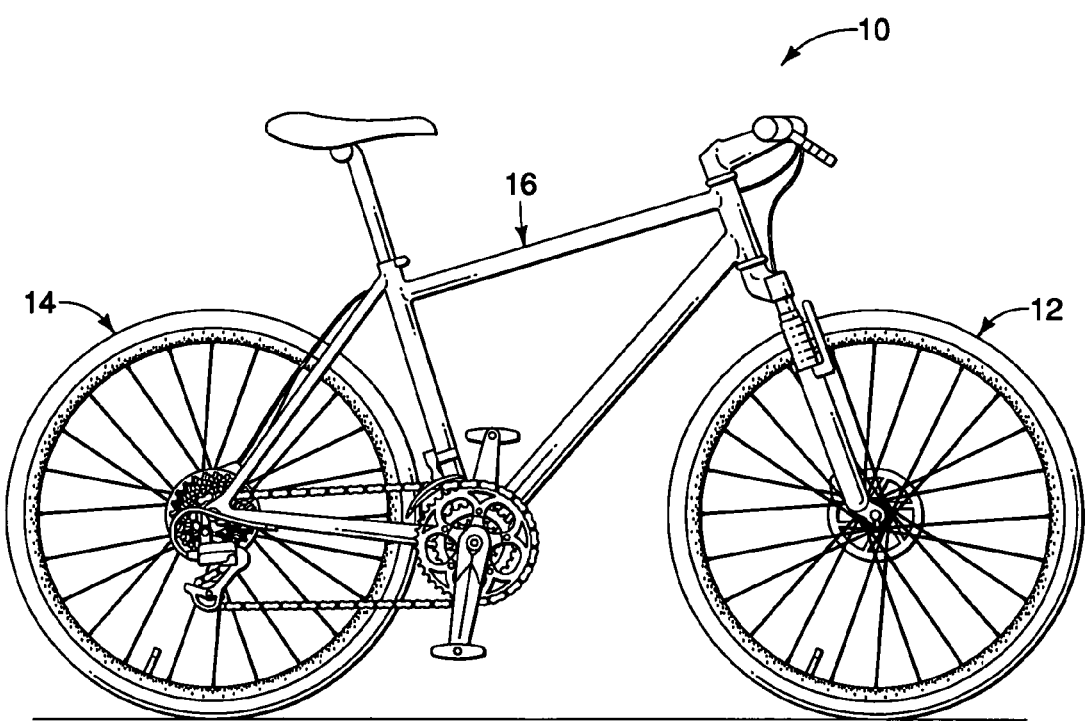
FIG. 1 is a side elevational view of a bicycle with a front bicycle wheel and a rear bicycle wheel in accordance with a first embodiment of the present invention.

Referring initially to FIG. 1, a bicycle 10 is illustrated with a front bicycle wheel 12 and a rear bicycle wheel 14 in accordance with a first embodiment of the present invention. The bicycle wheels 12 and 14 are attached to a bicycle frame 16 in a conventional manner. Since the parts of the bicycle 10 are well known in the art, the parts of the bicycle 10 will not be discussed or illustrated in detail herein, except for the parts that relate to the present invention. In other words, only the parts related to the bicycle wheels 12 and 14 will be discussed and illustrated in detail herein. Moreover, various conventional bicycle parts such as brakes, additional sprockets, derailleurs, etc., which may or may not be illustrated herein, can be used in conjunction with the present invention.

Figure 2:
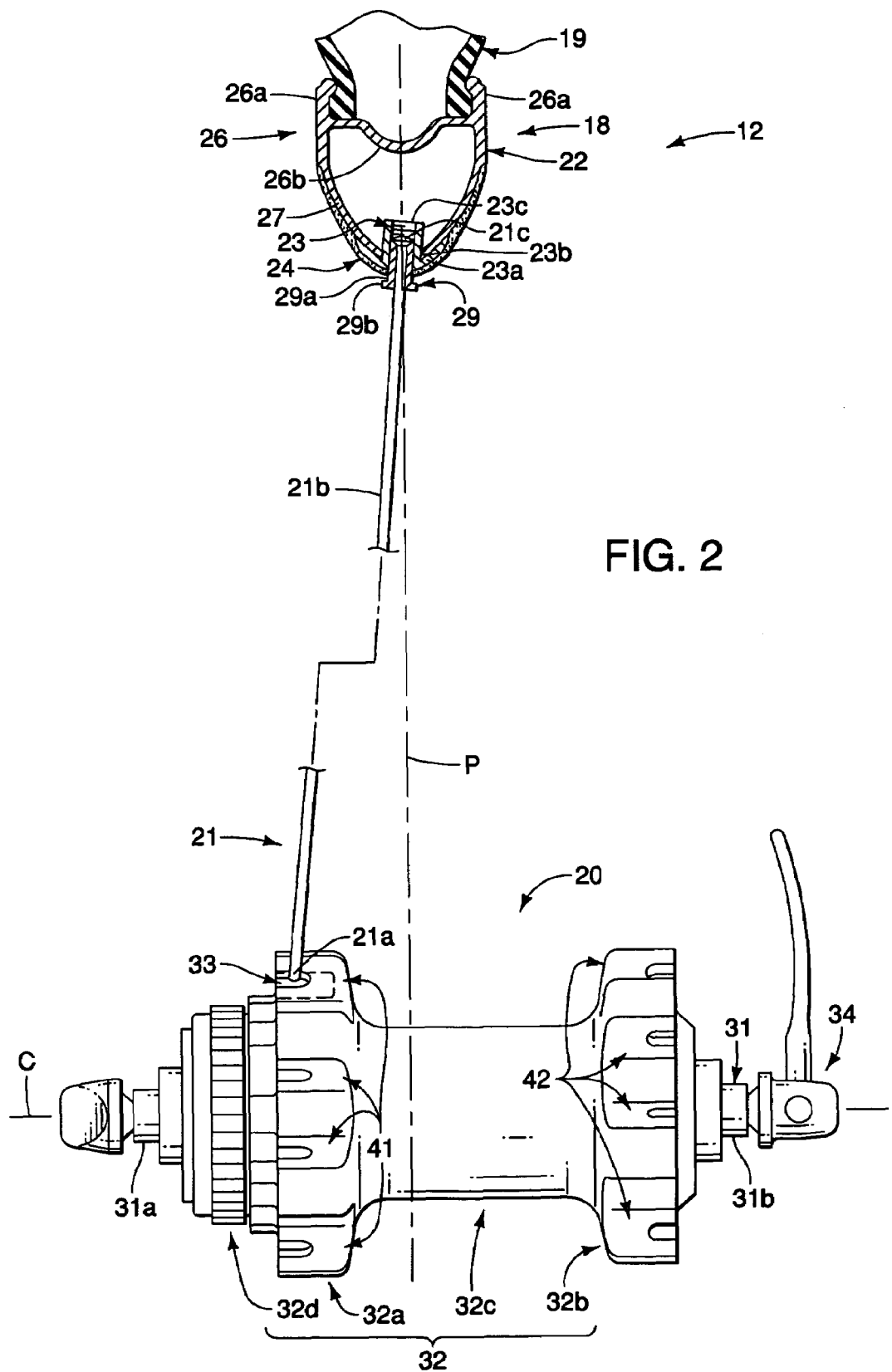
FIG. 2 is a partial rear side view of the front wheel illustrated in FIG. 1 with the bicycle hub shown in elevation and the rim shown in cross section.
Figure 3:
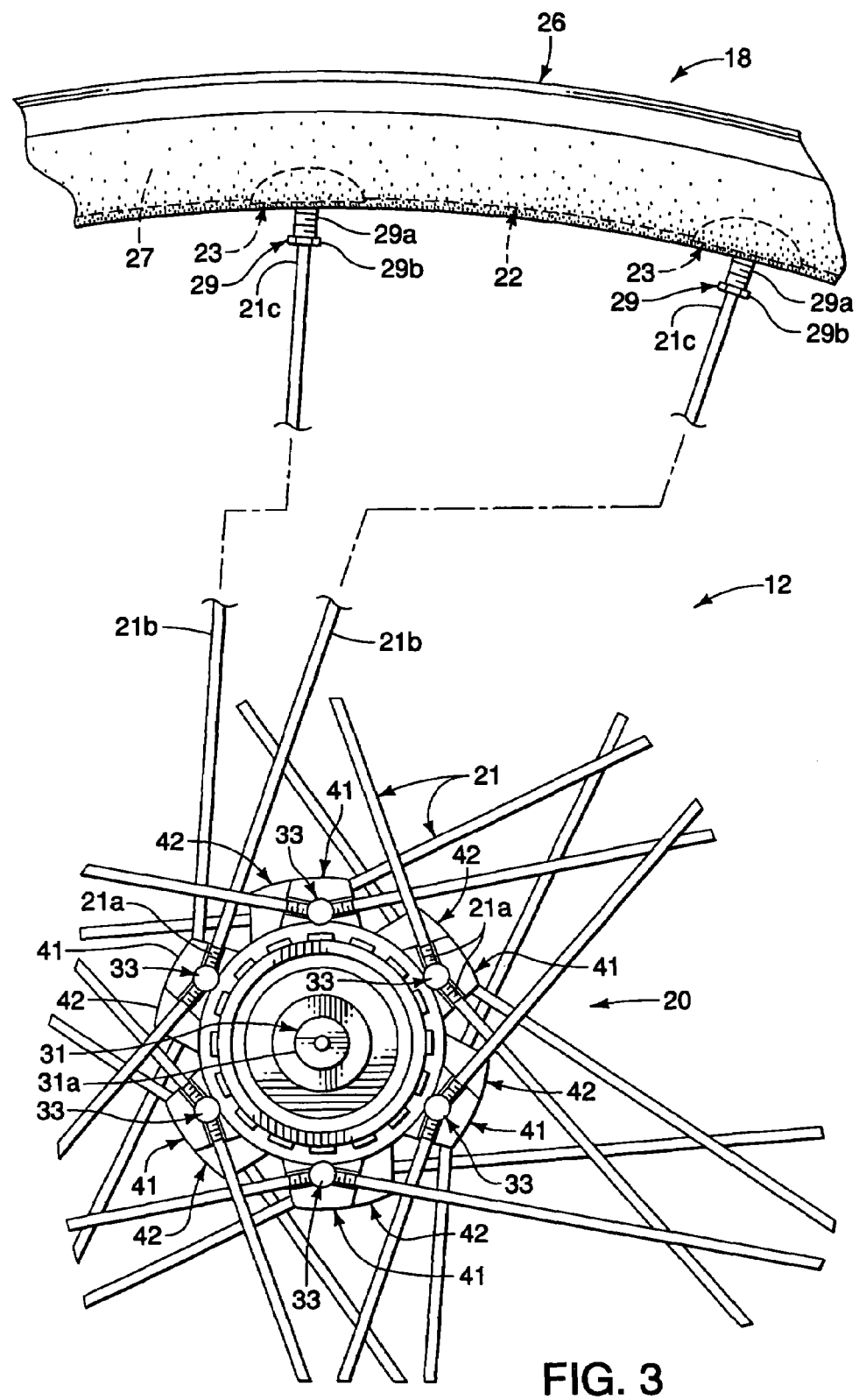
FIG. 3 is a partial side elevational view of the front wheel illustrated in FIGS. 1 and 2.

Generally, the present invention is applied in the same manner to both of the bicycle wheels 12 and 14. Also some of the parts of the bicycle wheels 12 and 14 are identical or have the same function. Thus, the identical parts of the bicycle wheels 12 and 14 will be given the same reference numerals. Referring to FIGS. 2 and 3, the front bicycle wheel 12 basically includes an annular rim 18 with a pneumatic tire 19, a center hub 20, and a plurality of spokes 21.

Still referring to FIGS. 2 and 3, the rim 18 is an annular member designed for rotation about a center axis C of the front bicycle wheel 12. In other words, the rim 18 is substantially circular as seen in side elevation (FIG. 1). The rim 18 basically includes an annular metallic rim member 22, a plurality of individual reinforcement members 23 and a plurality of adhesive attachment materials or sheets 24. Thus, the rim 18 is a composite rim made of both metallic and non-metallic materials. The reinforcement members 23 are directly adhesively attached to the annular metallic rim member 22 by an adhesive without heat and held on the annular metallic rim member 22 by the adhesive attachment materials or sheets 24. While heat is used to apply the adhesive attachment materials or sheets 24, the heat is lower than a temperature that would physical alter the metallic material of the annular metallic rim member 22. Thus, the reinforcement members 23 are not welded or brazed to the annular metallic rim member 22, which would physical alter the metallic material of the annular metallic rim member 22.

The annular metallic rim member 22 basically includes an annular tire attachment portion 26 and a spoke attachment portion 27 with a plurality of spoke openings 28. Basically, the annular metallic rim member 22 has a uniform cross-sectional profile, except for the absence of material for accommodating an air filling valve (not shown) and the spoke openings 28. The annular metallic rim member 22 is constructed of a substantially rigid material, such as those materials, which are well known in the art. For example, the annular metallic rim member 22 can be constructed of any suitable metallic material, such as plated steel, stainless steel, aluminum, magnesium or titanium. Preferably, the annular metallic rim member 22 is constructed of aluminum. The construction of the annular metallic rim member 22 will now be discussed in more detail below.

Figure 4:
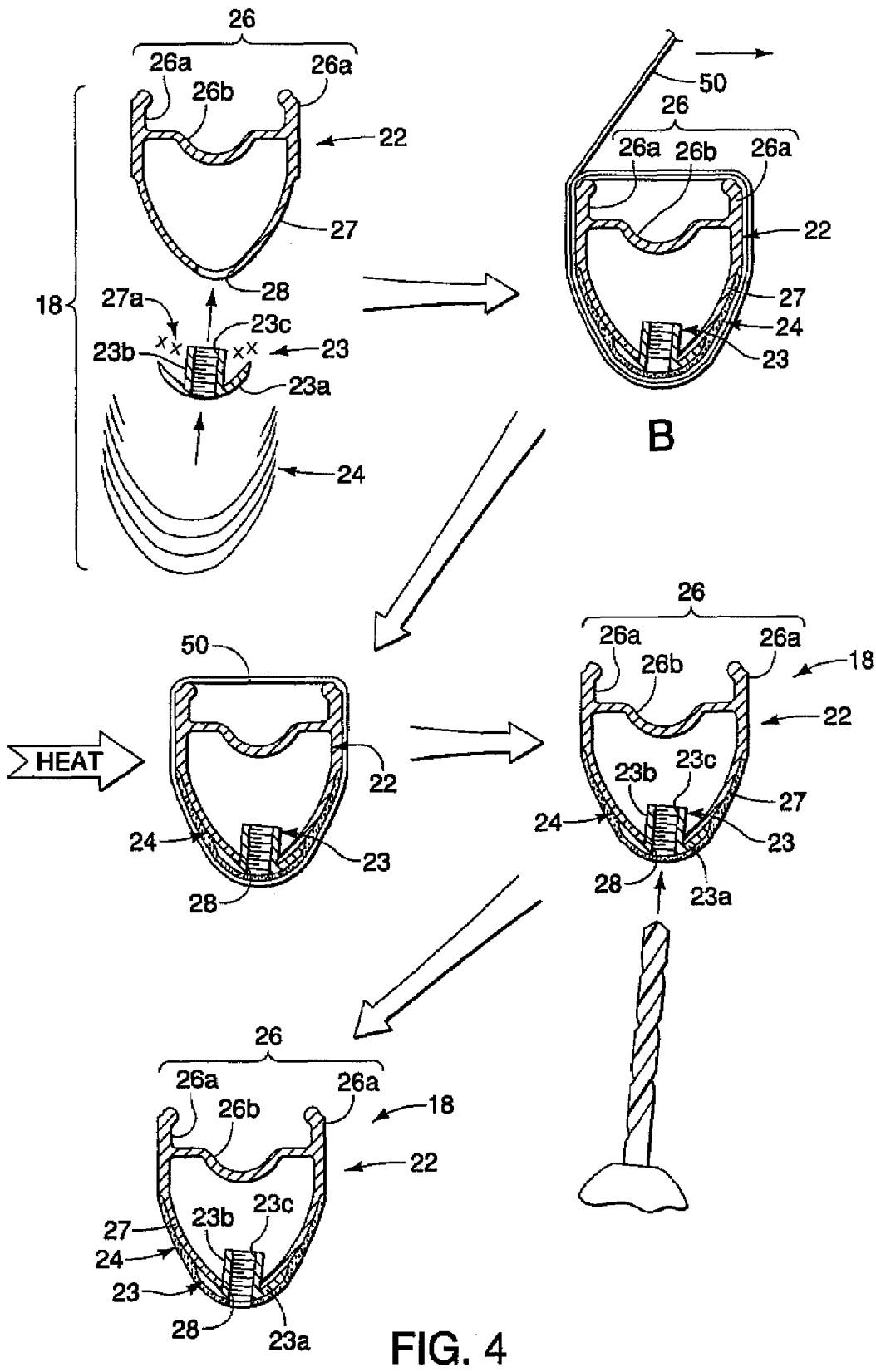
FIG. 4 is a series of cross sectional view showing a preferred method of manufacturing the rim illustrated in FIGS. 1-3 in accordance with the first embodiment of the present invention.

As seen in FIGS. 2 and 4, the annular tire attachment portion 26 is an outer annular portion of the annular metallic rim member 22 that is configured and arranged to have the tire 19 mounted thereon in a conventional manner. The annular tire attachment portion 26 basically includes a pair of annular side sections 26a and an annular outer bridge or connecting section 26b. The annular connecting section 26b extends between the annular side sections 26a to form a substantially U-shaped tire receiving recess as seen in cross-section in FIG. 2. The annular side sections 26a are annular plate shaped members that form a pair of annular tire supporting surfaces and a pair of annular braking surfaces in a conventional manner. The tire supporting surfaces of the annular side sections 26a are opposed annular surfaces that face each other toward the center plane P. The tire supporting surfaces have annular ribs formed at their free ends to retain beads of the tire 19 in a conventional manner. The annular braking surfaces of the annular side sections 26a face outwardly away from the center plane P to engage conventional rim brakes.

The annular connecting section 26b is a curved tubular member that includes a single valve aperture formed therein for coupling an air valve therein in a conventional manner. Thus, preferably, the annular connecting section 26b is free of openings, except for the single valve aperture such that the tire 19 can be a tubeless tire. However, it will be apparent to those skilled in the art from this disclosure that the tire 19 could be a tube-type tire, and that the valve aperture could receive the valve of the tube in a conventional manner.

The spoke attachment portion 27 is an inner annular portion of the annular metallic rim member 22 that extends from the annular connecting section 26b of the annular tire attachment portion 26 to form a hollow interior. Thus, the spoke attachment portion 27 is a tubular member that has U-shaped cross-sectional shape. The spoke openings 28 are evenly spaced about an innermost part of the circumference of the spoke attachment portion 27 for receiving the reinforcement members 23 therein as best understood from FIG. 1. In the illustrated embodiment, the spoke attachment portion 27 has twenty-four of the spoke openings 28 in order to attach a total of twenty-four spokes 21. Alternating ones of the spoke openings 28 are preferably slightly angled in opposite axial directions relative to a rim center plane so that the spokes 21 coupled thereto extend to opposite ends of the hub 20. Preferably, the spokes 21 are coupled between the hub 20 and the spoke attachment portion 27 so that the wheel 12 is dished, i.e., the rim 18 is offset from the center of the hub 22 towards one end. Each of spoke openings 28 is configured to receive one of the reinforcement members 23 therein as seen in FIG. 2.

The reinforcement members 23 are bonded to an inner portion of the rim 18 by adhesive 27a or the like that does not require heat of temperature that would adversely effect the physical properties of the annular metallic rim member 22. In other words, the reinforcement members 23 are fixedly coupled to the annular metallic rim member 22 of the rim 18 in order to reinforce the annular metallic rim member 22. Each reinforcement member 23 is preferably constructed as a one-piece unitary member from a lightweight, rigid metallic material that is separate from the annular metallic rim member 22. Specifically, each reinforcement member 23 is preferably constructed of aluminum. The reinforcement members 23 are preferably formed by casting, machining and/or any other suitable manufacturing technique. The reinforcement members 23 are adhesively attached to the discrete exterior surface areas of the spoke attachment portion 27 by adhesive disposed at interfaces between the reinforcement members 23 and the discrete exterior surface areas of the spoke attachment portion 27.

Preferably, as best seen in FIG. 4, each of the reinforcement members 23 includes a reinforcement plate section 23a overlying one of the discrete exterior surface areas of the spoke attachment portion 27, and a tubular section 23b extending from a corresponding one of the reinforcement plate sections 23a and through a corresponding one of the spoke openings 28 of the spoke attachment portion 27. Thus, in this embodiment each of the reinforcement members 23 has a substantially inverted mushroom shape as best shown in FIG. 2. The reinforcement plate sections 23a of the reinforcement members 23 are adhesively attached to the exterior surface of the spoke attachment portion 27 in order to partially secure the reinforcement members 23 thereto. The adhesive attachment materials or sheets 24 are used to more securely and permanently attach the reinforcement members 23 to the exterior surface of the spoke attachment portion 27 as discussed below. The reinforcement plate sections 23a of the reinforcement members 23 effectively increase the thickness of the spoke attachment portion 27 at the spoke openings 28 to provide rigid reinforcement to the rim 18. The tubular section 23b of each of the reinforcement members 23 has a threaded bore 23c in order to threadedly couple one of the spokes 21 thereto by an adapter 29.

The adapters 29 are tubes with external threads 29a and a non circular (e.g., rectangularly shaped, hexagonally shaped, longitudinally splined, etc) tool engaging portion 29b. The adapters 29 are mounted on the shafts of the spokes 21 such that one end of the adapter 29 engages one of the spokes 21. The external threads 29a of the adapters 29 are configured to mate with the internal threads of the threaded bore 23c of the reinforcement members 23. Thus, the spokes 21 can be adjustably, releasably and fixedly coupled to the rim 18 via the adapters 29. Thus, the tension in the spokes 21 is adjusted by tightening or loosening the adapters 29.

The adhesive attachment materials or sheets 24 in this first embodiment are preferably thin sheets of continuous reinforcement fibers impregnated with a thermoset resin or a thermoplastic resin, which are often called prepreg sheets. The adhesive attachment sheets 24 (prepreg sheets) are soft material at room temperature. However, when the adhesive attachment sheets 24 (prepreg sheets) are heated, the resin becomes low viscosity. However, after this (heating) the resin of the adhesive attachment sheets 24 becomes very hard, e.g., solid at 130° C.-150° C. After the heat treatment, the overall thickness of carbon layer from the adhesive attachment sheets 24 becomes in the range of about 0.3 to about 0.5 mm. In the one preferred embodiment, the adhesive attachment sheets 24 (prepreg sheets) include carbon fibers or a glass fiber impregnated with an epoxy resin. In other preferred embodiments, the adhesive attachment sheets 24 (prepreg sheets) can include virtually any reinforcement fiber, with virtually any matrix resin that can carry out the present invention. The thickness and surface finish of the adhesive attachment sheets 24 (prepreg sheets) can be varied to suit the desired requirements of the wheel.

Preferably, four to six adhesive attachment sheets 24 are preferably used to cover the reinforcement members 23. In this embodiment, four to six adhesive attachment sheets 24 are configured and arranged to cover an entire circumferential section of the spoke attachment portion 27 that includes all of the reinforcement members 23. Additionally, some of the adhesive attachment sheets 24 can be used to cover areas of the spoke attachment portion 27 that are above and between the reinforcement members 23. Thus, not all of the adhesive attachment sheets 24 need to cover the reinforcement members 23. Rather, some of the adhesive attachment sheets 24 can be used to gradually taper the step caused by the thickness of the reinforcement plate section 23a of the reinforcement members 23.

Referring to FIGS. 2 and 3, the hub 20 will now be discussed in more detail. The hub 20 basically includes an axle 31 with a hub shell or body 32 disposed about the axle 31 in a rotatable manner by a pair of bearings in a conventional manner. The hub 20 further includes a plurality of spoke securing elements 33 for securing the spokes 21. The other parts of the hub 20, other than the hub shell or body 32 and the spoke securing elements 33, are relatively conventional for the purposes of the present invention. Thus, these other parts of the hub 20 will not be discussed or illustrated in detail herein.

The axle 31 is a hard rigid member that has a pair of opposite free ends 31a and 31b extending outwardly from the hub shell 32. The free ends 31a and 31b of the axle 31 are fixedly coupled the frame 16 via a quick release device 34 in a conventional manner. The axle 31 has a center axis C that defines the center axis of the wheel 12.

As best seen in FIG. 2, the hub shell 32 is a hard rigid tubular member that is rotatably supported on the axle 31. The hub shell 32 includes a first spoke mounting portion 32a, a second spoke mounting portion 32b and a tubular center portion 32c disposed between the mounting portions 32a and 32b. Thus, the spoke mounting portions 32a and 32b are disposed at opposite ends of the hub shell 32. The spoke mounting portions 32a and 32b are configured and arranged to fixedly secure the spokes 21 thereto. The spoke mounting portions 32a and 32b are preferably mirror images of each other as shown, except that the spoke mounting portion 32a is circumferentially offset from the spoke mounting portion 32b. Of course, the spoke mounting portions 32a and 32b do not need to be mirror images of each other if needed and/or desired. Optionally, the hub shell 32 is also provided with a brake mounting portion 32d for attaching a disc brake rotor (not shown). The optional disc brake rotor (not shown) can be attached to the hub shell 32 by a retaining or locking ring that is threaded into on the end of the hub shell 32 such as disclosed in U.S. Pat. No. 6,371,252 to Kanehisa (Assigned to Shimano, Inc.).

The spoke mounting portion 32a includes a plurality (six) of individual spoke fixing parts or protrusions 41 that extend outwardly in a radial manner from one end of the hub shell 32. The spoke fixing parts 41 are equally spaced apart in a circumferential direction around the main body of the spoke mounting portion 32a. Each of the spoke fixing parts 41 is configured and arranged to fix a pair of the spokes 21 thereto using two of the spoke securing elements 33. Each of the spoke fixing parts 41 is preferably identical as shown. Of course, the spoke fixing parts 41 do not need to be identical if needed and/or desired.

Likewise, the mounting portion 32b includes a plurality (six) of individual spoke fixing parts or protrusions 42 that extend outwardly in a radial manner from one end of the hub shell 32. The spoke fixing parts 42 are equally spaced apart in a circumferential direction around the main body of the spoke mounting portion 32b. The spoke fixing parts 42 are preferably offset mirror images of the spoke fixing parts 41. In other words, the spoke fixing parts 42 are circumferentially offset from the spoke fixing parts 41 by an acute angle such as 15° and face in the opposite axial direction from the spoke fixing parts 41 as seen in FIGS. 2 and 3.

Each of the spoke fixing parts 42 is configured and arranged to fix a pair of the spokes 21 thereto using one of the spoke securing elements 33. Each of the spoke fixing parts 42 is preferably identical as shown. Of course, the spoke fixing parts 42 do not need to be identical if needed and/or desired. Thus, the spoke fixing parts or protrusions 41 and 42 of the hub shell 32 are individual radial projections that are circumferentially spaced apart about opposite ends of the hub shell 32.

The spokes 21 are tension spokes that interconnect the hub 20 and the rim 18 together as explained below. In the illustrated embodiment, the front bicycle wheel 12 includes twenty-four of the spokes 21 that extend generally tangentially from the hub 20 to the rim 18. Also, in the illustrated embodiment, the spokes 21 are coupled to the rim 18 at equally spaced circumferential locations as seen in FIG. 1. Of course, it will be apparent to those skilled in the art from this disclosure that the front bicycle wheel 12 could use a modified rim and/or hub in order to accommodate different spoking arrangements without departing from the scope of the present invention. Moreover, it will be apparent to those skilled in the art from this disclosure that the front bicycle wheel 12 could use a modified rim and/or hub in order to accommodate fewer or more spokes 21 if needed and/or desired. In any case, the spokes 21 are preferably coupled to the annular rim 18 in circumferentially spaced arrangement.

Referring now to FIGS. 2 and 3 the spokes 21 are preferably straight spokes that are identical to each other. Each of the spokes 21 basically includes a threaded inner end portion 21*a*, a straight center or a middle portion 21*b* and an outer headed end portion 21*c*. The portions 21*a*, 21*b* and 21*c* of each of the spokes 21 are preferably integrally formed together as a one piece, unitary member. The threaded inner end portions 21*a* of the spokes 16 are coupled to the hub 20, while the outer end portions 21*c* of the spokes 21 are coupled to the rim 18 via the adapters 29 mating with the reinforcement members 23. The spokes 21 are preferably wire-type spokes that are relatively conventional. Thus, the spokes 21 will not be discussed and/or illustrated in detail herein, except as related to the hub 20 of the present invention.

Referring now to FIG. 4, a preferred method of manufacturing rim 18 will now be discussed. First, the annular metallic rim member 22 is formed utilizing conventional rim manufacturing techniques. For example, the annular metallic rim member 22 can be constructed by extruding a length of aluminum with the cross-sectional shape that includes the annular tire attachment portion 26 and the spoke attachment portion 27 as illustrated in FIG. 2. Then, the aluminum extruded rim member is cut to the appropriate length and bent into a circular shape. The ends of the aluminum extruded rim member are then welded together. The spoke openings 28 can be punched or drilled in a conventional manner before or after welding the free ends of the aluminum extruded rim member together.

Once the annular metallic rim member 22 is formed with the cross-sectional shape illustrated in FIG. 2, the individual reinforcement members 23 are attached to the spoke attachment portion 27 of the annular metallic rim member 22. As mentioned above, the reinforcement members 23 are preferably constructed of aluminum by casting, machining and/or any other suitable manufacturing technique. The tubular section 23*b* of each of the reinforcement members 23 is inserted into one of the spoke openings 28 such that the reinforcement plate sections 23*a* of the reinforcement members 23 overlie discrete exterior surface areas of the spoke attachment portion 27 surrounding the spoke openings 28. Preferably, the adhesive 27*a* is applied to one of the surfaces of the reinforcement plate sections 23*a* of the reinforcement members 23 and the discrete exterior surface areas of the spoke attachment portion 27 surrounding the spoke openings 28 so that the reinforcement plate sections 23*a* are adhesively attached to the exterior surface of the spoke attachment portion 27 in order to partially secure the reinforcement members 23 thereto.

Next, the adhesive attachment materials or sheets 24 are applied to more securely and permanently attach the reinforcement members 23 to the exterior surface of the spoke attachment portion 27. In this embodiment, four to six adhesive attachment sheets 24 are arranged to cover an entire circumferential section of the spoke attachment portion 27 that includes all of the reinforcement members 23. Optionally, some of the adhesive attachment sheets 24 can be used to cover areas of the spoke attachment portion 27 that are above and between the reinforcement members 23. In any event, in this embodiment, the adhesive attachment sheets 24 is applied such that the adhesive attachment sheets 24 extend continuously about an entire circumferential area of the spoke attachment portion 27 that includes all of the reinforcement members 23.

The application of the adhesive attachment sheets 24 is accomplished by applying a heat shrink wrap material 50 over the adhesive attachment sheets 24. Preferably, the heat shrink wrap material 50 is a tape that is spirally wound around the entire circumference of the annular metallic rim member 22 with a slight overlap between adjacent coils. Then heat is applied to the heat shrink wrap material 50 such that the heat shrink wrap material 50 firmly presses the adhesive attachment sheets 24 against the reinforcement members 23 and the spoke attachment portion 27 adjacent to the adhesive attachment sheets 24. This application of the heat to the heat shrink wrap material 50 also causes the resin of the adhesive attachment sheets 24 to melt and thus adhere to both the reinforcement members 23 and the spoke attachment portion 27. Since the adhesive attachment sheets 24 overlap the reinforcement members 23 and the spoke attachment portion 27, a strong bond is created between the spoke attachment portion 27 and the reinforcement members 23 by the epoxy resin (bonding material) in the adhesive attachment sheets 24 that was activated by application of the heat to the heat shrink Wrap material 50.

Now, the heat shrink wrap material 50 is removed to expose the adhesive attachment sheets 24 that have been bonded to the annular metallic rim member 22. Now holes are formed in the adhesive attachment sheets 24 at each of the spoke openings 28. As shown, a drill is used. However, it will be apparent to one skilled in the art that other methods of forming the holes in the adhesive attachment sheets 24 that correspond to each of the spoke openings 28 can be used. Once the holes in the adhesive attachment sheets 24 have been fonned, the rim 18 is ready to be attached to the hub 20 by the spokes 21, the adapters 29 and the spoke securing elements 33 in the manner discussed above.

SECOND EMBODIMENT

Figure 5:
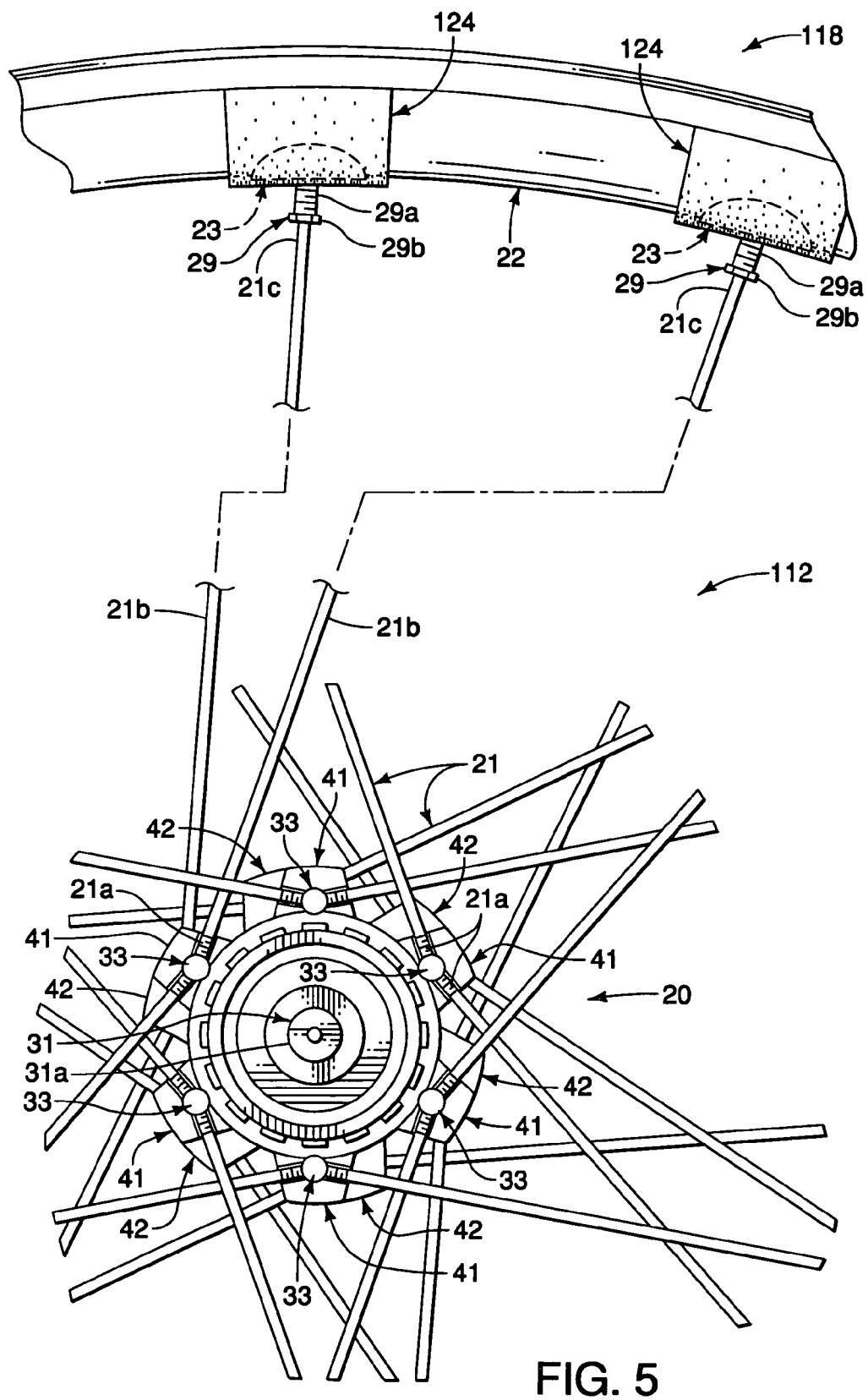
FIG. 5 is a partial side elevational view of a front wheel with a rim in accordance with a second embodiment of the present invention.

Referring now to FIG. 5, a portion of a modified front wheel 112 is illustrated in accordance with a second embodiment of the present invention. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In other words, unless otherwise specified, the configuration of the rim 118 of the second embodiment is the same as the configuration of the first embodiment. Moreover, unless otherwise specified, the method of manufacturing the rim 118 of the second embodiment is the same as the configuration of the first embodiment.

Basically, the only difference between the first and second embodiments is the application of the adhesive attachment material or sheets to the annular metallic rim member 22. In this second embodiment, a plurality of small discrete adhesive attachment material or sheets 124 are used so that only small discrete areas of the spoke attachment portion 27 that surround the reinforcement members 23 are individually covered. Thus, in manufacturing the modified front wheel 112, the adhesive attachment sheets 124 are initially attached to the annular metallic rim member 22 (manufactured as discussed above) using the heat shrink wrap material 50 that is spirally wound around the entire circumference of the annular metallic rim member 22 with a slight overlap between adjacent coils. Thus, the heat shrink wrap material 50 will hold the adhesive attachment sheets 124 at a plurality of individual sections or areas that are circumferentially spaced apart about the spoke attachment portion 27. Next, as in the first embodiment, heat is applied to the heat shrink wrap material 50 such that the heat shrink wrap material 50 firmly presses the adhesive attachment sheets 124 against the reinforcement members 23 and the spoke attachment portion 27 adjacent to the adhesive attachment sheets 124. This application of the heat to the heat shrink wrap material 50 also causes the resin of the adhesive attachment sheets 124 to melt, and thus, adhere to both the reinforcement members 23 and the spoke attachment portion 27. Since the adhesive attachment sheets 124 overlap the reinforcement members 23 and the spoke attachment portion 27, a strong bond is created between the spoke attachment portion 27 and the reinforcement members 23 by the epoxy resin (bonding material) in the adhesive attachment sheets 124 that was activated by application of the heat to the heat shrink wrap material 50.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Also as used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rim comprising:
    an annular metallic rim member including an annular tire attachment portion adapted to have a tire mounted thereon, a spoke attachment portion with a plurality of spoke openings and a pair of oppositely facing metallic annular braking surfaces;
    a plurality of individual reinforcement members overlying discrete exterior surface areas of the spoke attachment portion surrounding the spoke openings; and
    at least one adhesive attachment material overlying the individual reinforcement members and exterior areas of the spoke attachment portion adjacent to the reinforcement members, the pair of oppositely facing metallic annular braking surfaces being free of the adhesive attachment material.

2. The bicycle rim according to claim 1, wherein
    the reinforcement members are adhesively attached to the discrete exterior surface areas of the spoke attachment portion by adhesive disposed at interfaces between the reinforcement members and the discrete exterior surface areas of the spoke attachment portion.

3. The bicycle rim according to claim 1, wherein
    the adhesive attachment material includes a sheet material with a resin.

4. The bicycle rim according to claim 3, wherein
    the sheet material includes one or more carbon impregnated layers, and the resin is epoxy.

5. The bicycle rim according to claim 3, wherein
    the sheet material has an overall thickness in a range of about 0.3 millimeters to about 0.5 millimeters.

6. The bicycle rim according to claim 1, wherein
    the adhesive attachment material extends continuously about an entire circumferential area of the spoke attachment portion.

7. The bicycle rim according to claim 1, wherein
    the adhesive attachment material includes a plurality of individual sections that are circumferentially spaced apart about the spoke attachment portion.

8. A bicycle rim comprising:
    an annular metallic rim member including an annular tire attachment portion adapted to have a tire mounted thereon, and a spoke attachment portion with a plurality of spoke openings;
    a plurality of individual reinforcement members overlying discrete exterior surface areas of the spoke attachment portion surrounding the spoke openings; and
    at least one adhesive attachment material overlying the individual reinforcement members and exterior areas of the spoke attachment portion adjacent to the reinforcement members,
    each of the reinforcement members including a reinforcement plate section overlying one of the discrete exterior surface areas, and a tubular section extending from a corresponding one of the reinforcement plate sections and through a corresponding one of the spoke openings of the spoke attachment portion.

9. A bicycle rim comprising:
    an annular metallic rim member including an annular tire attachment portion adapted to have a tire mounted thereon, and a spoke attachment portion with a plurality of spoke openings;
    a plurality of individual reinforcement members overlying discrete exterior surface areas of the spoke attachment portion surrounding the spoke openings, the reinforcement members being constructed of a metallic material; and
    at least one adhesive attachment material overlying the individual reinforcement members and exterior areas of the spoke attachment portion adjacent to the reinforcement members.

10. The bicycle rim according to claim 9, wherein
    the adhesive attachment material includes a sheet material with a resin.

11. The bicycle rim according to claim 10, wherein
    the sheet material includes one or more carbon impregnated layers, and the resin is epoxy.

12. The bicycle rim according to claim 10, wherein the sheet material has an overall thickness in a range of about 0.3 millimeters to about 0.5 millimeters.

13. The bicycle rim according to claim 10, wherein the adhesive attachment material extends continuously about an entire circumferential area of the spoke attachment portion.

14. The bicycle rim according to claim 10, wherein the adhesive attachment material includes a plurality of individual sections that are circumferentially spaced apart about the spoke attachment portion.

* * * * *